(12) United States Patent
Harada et al.

(10) Patent No.: US 10,513,613 B2
(45) Date of Patent: Dec. 24, 2019

(54) C.I. PIGMENT YELLOW 155 AND PROCESS FOR PREPARING THE SAME, PIGMENT COMPOSITION AND COLORANT COMPOSITION CONTAINING THE PIGMENT, AND USE THEREOF AS COLORANT

(71) Applicant: CLARIANT PLASTICS & COATINGS LTD, Muttenz (CH)

(72) Inventors: Daisuke Harada, Shizuoka (JP); Tomohiro Chino, Shizuoka (JP)

(73) Assignee: Clariant Plastics & Coatings Ltd, Muttenz (SE)

( * ) Notice: Subject to any disclaimer, the term of this patent is extended or adjusted under 35 U.S.C. 154(b) by 0 days.

(21) Appl. No.: 15/524,258

(22) PCT Filed: Oct. 23, 2015

(86) PCT No.: PCT/EP2015/074628
§ 371 (c)(1),
(2) Date: May 3, 2017

(87) PCT Pub. No.: WO2016/071125
PCT Pub. Date: May 12, 2016

(65) Prior Publication Data
US 2017/0313884 A1    Nov. 2, 2017

(30) Foreign Application Priority Data

Nov. 4, 2014  (JP) .................. 2014-224569

(51) Int. Cl.
| | | |
|---|---|---|
| *C09B 33/153* | (2006.01) | |
| *C09D 11/037* | (2014.01) | |
| *C09B 67/10* | (2006.01) | |
| *C09B 67/22* | (2006.01) | |
| *C09D 11/322* | (2014.01) | |

(52) U.S. Cl.
CPC ........ *C09B 33/153* (2013.01); *C09B 67/0015* (2013.01); *C09B 67/0041* (2013.01); *C09B 67/0046* (2013.01); *C09B 67/0055* (2013.01); *C09D 11/037* (2013.01); *C09D 11/322* (2013.01)

(58) Field of Classification Search
CPC . C09B 33/153; C09B 67/005; C09B 67/0041; C09B 67/0055; C09B 67/0046; C09D 11/037; C09D 11/322
See application file for complete search history.

(56) References Cited

U.S. PATENT DOCUMENTS

| | | | | |
|---|---|---|---|---|
| 6,117,606 A * | 9/2000 | Macholdt | ............... | C09D 5/035 106/31.81 |
| 7,384,472 B2 * | 6/2008 | Schweikart | ......... | C09B 67/0046 106/31.78 |
| 2006/0167236 A1* | 7/2006 | Schupp | ................. | C09B 33/153 534/733 |
| 2006/0191441 A1* | 8/2006 | Robertson | ........... | C09B 67/0002 106/493 |
| 2007/0215008 A1 | 9/2007 | Schweikart et al. | | |
| 2009/0198045 A1* | 8/2009 | Paetzold | ............... | C09B 29/338 534/595 |
| 2009/0305156 A1* | 12/2009 | Weber | ................. | C09B 67/0022 430/108.23 |
| 2012/0094226 A1* | 4/2012 | Tani | ...................... | C09B 29/337 430/108.23 |
| 2012/0282543 A1 | 11/2012 | Lopez et al. | | |
| 2014/0141250 A1* | 5/2014 | Tateishi | ............... | C09D 11/326 428/402 |
| 2017/0218203 A1 | 8/2017 | Harada et al. | | |

FOREIGN PATENT DOCUMENTS

| | | |
|---|---|---|
| EP | 2241600 A2 | 10/2010 |
| EP | 2474581 A1 | 7/2012 |
| JP | 2006-309035 A | 11/2006 |
| JP | 3917764 B2 | 5/2007 |
| JP | 2016-034994 A | 8/2014 |
| WO | WO2009/049758 A2 * | 4/2009 |
| WO | 2016/016246 A1 | 2/2016 |

OTHER PUBLICATIONS

International Search Report and Written Opinion issued in corresponding International Patent Application No. PCT/EP2015/074628, dated May 10, 2016.

International Preliminary Report on Patentability issued in corresponding International Patent Application No. PCT/EP2015/074628, dated May 9, 2017.

* cited by examiner

*Primary Examiner* — Anthony J Green (74) *Attorney, Agent, or Firm* — Morgan, Lewis & Bockius LLP (57) ABSTRACT

The present invention provides C.I. Pigment Yellow 155 having a methanol wettability (MW value) of the pigment powder of 10% to 2%, each inclusive.

13 Claims, 2 Drawing Sheets

Fig. 1: Morphology of pigment of Example 2 (11,000×)

Figure 2: Morphology of pigment of Comparative Example 1 (without finishing treatment) (11,000×)

C.I. PIGMENT YELLOW 155 AND PROCESS FOR PREPARING THE SAME, PIGMENT COMPOSITION AND COLORANT COMPOSITION CONTAINING THE PIGMENT, AND USE THEREOF AS COLORANT

TECHNICAL FIELD

The present invention relates to C.I. Pigment Yellow 155 that has appropriate hydrophobicity and is excellent in handleability during the preparation of a colorant and in image fixability.

BACKGROUND ART

Methods for forming or displaying images by the subtractive color process using printing inks, coating materials, toner, ink-jet inks, or the like are generally performed by the combination of three primary colors yellow (Y), magenta (M), and cyan (C). Each pigment for colorants of such three primary colors is required to have the following characteristics:
1) high color rendering performance indicated by hue, chroma, lightness, and the like;
2) excellent manufacturability; and
3) image quality and durability on printing paper.

Firstly, as for the color rendering performance, when images represented on a color display are printed on a color printer, the images tend to be less sharp because the color reproduction range of the printer ink (YMC color space) is narrower than the color reproduction range on the color display (RGB color space). One of the causes thereof is the low lightness or chroma of pigments, and attempts to improve the lightness or chroma of pigments have been widely made.

Secondly, as for the manufacturability, pigments need to satisfy various physicochemical characteristics for preparing inks or toner. For example, it is necessary that a pigment dispersion should have suitable viscosity. Furthermore, in the case of the preparation of toner by an emulsion polymerization method as disclosed in Patent Document 1, appropriate surface characteristics are required such that monomers can be adsorbed on pigment surfaces.

Thirdly, as for the quality on printing paper, light resistance, strong affinity toward resin binders for obtaining physical strength (e.g., frictional strength), and the like are also required in addition to color imaging performance.

To respond to these needs, improvement in pigments for each hue has heretofore been made. For example, as for yellow pigments, many azo pigments have been developed because there is a wide option for preparing them and, accordingly, the control of their color rendering properties such as hue is relatively easy, and further manufacturability, etc. is also good. Among others, various azo pigments carrying a plurality of azo groups in their molecules have been developed, since such azo pigments, in addition to a strong color force, correspondingly have a high molecular weight, resulting in enhanced aggregation properties, and further are also preferable for light resistance, etc. For such pigments, on the ground that the absorption spectrum width can be narrowed and the sharpness can be easily improved, many pigments having a molecular structure where the intramolecular azo groups are present at symmetric positions have been developed. For example, Patent Document 2 describes C.I. Pigment Yellow 155.

The molecular structure as seen in C.I. Pigment Yellow 155 is preferred for conferring high color rendering properties, but is not always preferable in light of manufacturability or image intensity. For example, when the azo pigment C.I. Pigment Yellow 155 having two azo groups at symmetric positions as mentioned above is dispersed in a solvent, its viscosity becomes very high even in the absence of a binder. Therefore, uniform stirring is difficult when attempting emulsion polymerization by adding monomers to an aqueous dispersion of the pigment. As a result, it is difficult to obtain toner having uniform performance.

Since the viscosity is high even in resin-free systems as described above, the viscosity is further increased when a binder resin is added for the purpose of preparing, for example, ink jet inks, resists for color filters, or the like. Such a highly viscous pigment dispersion complicates appropriate dispersion (adjustment of pigment particle size and its distribution) and requires a large dispersion apparatus, dispersion procedures for a long time, etc., putting a heavy burden onto manufacture of products using the pigment. As further problems, too high a viscosity of pigment dispersions may cause difficult ink discharge at a ink jet head; or in the case of poor dispersion, coarse pigment particles may remain, which cause poor image quality or clogging of ink jet nozzles.

Against this backdrop, various approaches such as the change of the type of solvents or the lowering of pigment concentration have been carried out in order to reduce the viscosity of pigment dispersions. However, none of them are fully satisfactory under the present circumstances.

As mentioned above, regarding C.I. Pigment Yellow 155 excellent in color rendering properties, there is a strong need to reduce the viscosity of a dispersion thereof. If C.I. Pigment Yellow 155 that brings about a low viscosity of its dispersion can be prepared, this pigment can replace the conventional pigments for electrophotographic toner or ink-jet inks and enable more colorful color images to be obtained at low cost. Furthermore, if C inks among the C, M, Y, and K inks in the conventional process inks can be replaced with ones having high chroma, many applications such as colorants for high-chroma second colors, for example, green color using such inks, are expected.

LIST OF RELATED ART DOCUMENTS

Patent Document

[Patent Document 1] JP2006309035A
[Patent Document 2] JP3917764B

SUMMARY OF INVENTION

Problem to be Solved by the Invention

A first object of the present invention is to adjust the viscosity of a dispersion of C.I. Pigment Yellow 155 to within an appropriate range, thereby improving the operability and handleability during the preparation of a colorant and, at the same time, enhancing the uniformity and reproducibility of the quality of the colorant. Furthermore, when images obtained using the pigment prepared according to the present invention were evaluated in the course leading to the present invention, the obtained results have showed that the intensity of the images was relatively low in some cases. Therefore, an additional object of the present invention is to provide a pigment that can prevent such reduction in image intensity. Further objects of the present invention will be apparent to those skilled in the art from the description given below.

Means for Solving the Problems

In light of the situations described above, the present inventors have conducted diligent studies to solve the disadvantages of the conventional techniques and consequently obtained guidelines given below for attaining the objects of the present invention.
(1) At first, it was considered that the high viscosity of the pigment dispersion was caused by an interaction between the pigment and resin. However, a pigment dispersion free from the resin still exhibited high viscosity. Therefore, it was presumed that there is a large interaction between the pigment particles and/or between the pigment and solvent molecules.
(2) As a result of observing the crystal form under an electron microscope in order to find the cause thereof, there were found very small and long thin needle-like crystals.
(3) It was predicted that, on the one hand, based on said the needle-like shape, the crystal particles would strongly interact with each other; and, on the other hand, based on the large surface area, the crystals would strongly interact with the solvent. One of these factors, or both, were presumed to increase the viscosity of the dispersion.
(4) Accordingly, various studies were conducted in respect to methods for decreasing these interactions between the pigment particles and between the pigment and the solvent. The specific strategy was: to alter the needle-like shape of the pigment particles to decrease the aspect ratio thereof; to increase the pigment particle size; and to change the pigment surface properties so as to decrease the interaction between the particles or between the particles and the solvent.
(5) On the basis of the guidelines described above, various studies have been conducted, mainly, regarding steps subsequent to the azo coupling reaction. As a result, a pigment satisfying the needs mentioned above was successfully obtained by carrying out a finishing treatment using a high-boiling solvent after the preparation of the pigment.
(6) As a result of analyzing the reason therefor, it was found that the finishing not only modifies the shape of the pigment crystals, but also promotes their growth, resulting in an increase in the crystal size.
(7) It was presumed that such alteration of the crystal shape and growth of the particles decreased the contact between the particles and decreased the interaction between the pigment and the solvent.
(8) When mixing the pigment thus prepared with a resin and a solvent, the results, achievement of low liquid viscosity and also improvement in the handleability, etc. of the dispersion, were able to be confirmed.
(9) When applying the colorant dispersion thus obtained onto printing paper and drying the paper, and evaluating the resulting film, it was found that the frictional strength, which correlates with fixability, of the colorant film (which corresponds to pixels in printing) on the printing paper was occasionally relatively low, depending on the finishing conditions for the pigment. The main factors of the low frictional strength were presumed to be a reduction in the adhesion of the coating film to the paper and a reduction in the adhesion of the pigment particles to the resin.
(10) Accordingly, as a result of studying the cause of the low image intensity by microscopic observation and others, the adhesion of the pigment to the resin was considered to be principally responsible. Since resins are highly hydrophobic, this change in the adhesion of the pigment to the resin was presumably attributed to a reduction in the hydrophobicity of the pigment surface, an increase in the hydrophilicity of the pigment surface, or a change in the surface area.
(11) Accordingly, as a result of searching for means for quantifying the surface characteristics of the pigment particles, a value measured by a methanol wettability method mentioned later (MW value) was found to serve as a favorable means for determining the surface characteristics of the pigment of the present invention and controlling the performance of the pigment. It was found that, by adjusting the MW value to within an appropriate range, not only can the viscosity of pigment dispersions be controlled but the frictional strength of images can be controlled.
(12) Specifically, it was found that: the pigment dispersion viscosity can be reduced by adjusting the finishing conditions for the pigment so that the MW value is equal to or lower than a specific value; and additionally, a pigment coating film having improved frictional strength can be obtained by setting the MW value to equal to or higher than a specific value.

On the basis of the guidelines described above, the present inventors have searched for conditions for a process for preparing Pigment Yellow 155, etc., which are effective for reducing the viscosity of pigment dispersions and can further improve image intensity on printing paper, with a particular focus on finishing conditions for azo pigments.

Accordingly, the present invention relates to:
1. Pigment Yellow 155 having a methanol wettability (MW value) of the powder within the range of 10% or less.
2. Pigment Yellow 155 as set forth in the above 1, wherein the methanol wettability (MW value) of the powder is within the range of 2% or more.
3. Pigment Yellow 155 as set forth in the above 1 or 2, wherein the primary particle size, as measured by TEM, ranges from 50 nm to 300 nm, and the aspect ratio ranges from 1 to 10.
4. Pigment Yellow 155 as set forth in any of the above 1 to 3, wherein the primary particle size, as measured by TEM, ranges from 50 to 250 nm, and the aspect ratio of the pigment ranges from 1 to 7.
5. Pigment Yellow 155 as set forth in any of the above 1 to 4, wherein the residual organic solvent content is less than 500 ppm.
6. Pigment Yellow 155 as set forth in the above 5, wherein the residual organic solvent content is less than 100 ppm.
7. Pigment Yellow 155 as set forth in the above 5 or 6, wherein the organic solvent is an organic solvent having a boiling point of 95° C. or higher.
8. Pigment Yellow 155 as set forth in any of the above 5 to 7, wherein the organic solvent is a linear, branched or cyclic, saturated or unsaturated, monohydric or polyhydric alcohol solvent having 3 or more carbon atoms.
9. Pigment Yellow 155 as set forth in the above 8, wherein the alcohol solvent is one or more solvents selected from the group consisting of 1-propanol, 1-butanol, 2-butanol, isobutanol, 1-pentanol, 2-pentanol, 2-hexanol, 1-heptanal, 2-heptanol, ethylene glycol, and glycerin.
10. Pigment Yellow 155 as set forth in any of the above 5 to 9, wherein the organic solvent is a finishing solvent used during the preparation of the pigment.

11. A pigment composition comprising Pigment Yellow 155 as set forth in any of the above 1 to 10, and a further color pigment and/or a yellow fluorescent dye.
12. A pigment composition as set forth in the above 11, wherein the further color pigment is one or more pigments selected from the group consisting of C.I. Pigment Yellow 74, C.I. Pigment Yellow 120, C.I. Pigment Yellow 151, C.I. Pigment Yellow 180, C.I. Pigment Yellow 185, C.I. Pigment Yellow 194, C.I. Pigment Yellow 198, C.I. Pigment Yellow 213, C.I. Pigment Yellow 214, and C.I. Pigment Yellow 217, and the yellow fluorescent dye is one or more dyes selected from the group consisting of Solvent Yellow 33, Solvent Yellow 98, Solvent Yellow 131, Solvent Yellow 135, and Solvent Yellow 160:1.
13. A colorant composition comprising, at least, Pigment Yellow 155 as set forth in any of the above 1 to 10, a polymer, and a wax.
14. A colorant composition comprising, at least, a pigment composition as set forth in the above 11 or 12, a polymer, and a wax.
15. A process for preparing Pigment Yellow 155 as set forth in any of the above 1 to 10, comprising steps of:
    1) synthesizing an azo pigment through a coupling reaction of a diazonium compound in an aqueous solution; and
    2) subjecting the azo pigment to a finishing treatment using an alcohol solvent having a boiling point of 95° C. or higher.
16. A process for preparing a pigment composition as set forth in the above 11 or 12, comprising steps of:
    1) synthesizing an azo pigment through a coupling reaction of a diazonium compound in an aqueous solution; and
    2) subjecting the azo pigment to a finishing treatment using an alcohol solvent having a boiling point of 95° C. or higher, wherein
    a further pigment and/or a fluorescent dye is added before or after the finishing.
17. A process as set forth in the above 15 or 16, wherein the alcohol solvent having a boiling point of 95° C. or higher is one or more solvents selected from the group consisting of linear, branched or cyclic, saturated or unsaturated, monohydric or polyhydric alcohols having 3 to 8 carbon atoms.
18. A process as set forth in any of the above 15 to 17, wherein the finishing treatment step is carried out by bringing the synthesized azo pigment into contact with the organic solvent, preferably mixing the azo pigment with the organic solvent, at a temperature 0 to 100° C. higher than the boiling point of the organic solvent for 10 minutes or longer.
19. Use of Pigment Yellow 155 as set forth in any of the above 1 to 10 as a colorant or in image formation.
20. Use of an azo pigment composition as set forth in the above 11 or 12 as a colorant or in image formation.

Advantageous Effects of Invention

According to the present invention, the viscosity of a pigment dispersion can be reduced by setting the methanol wettability value (MW value) of the pigment to equal to or lower than a specific value. Furthermore, the rub resistance of the coloring material can be improved by setting the MW value to equal to or higher than a specific value. As a result, a coloring material that is excellent in manufacturability during the preparation of the coloring material and also excellent in the physical strength of images can be provided.

A colorant containing this pigment can not only be used in various image formation applications including printing inks, toner, ink jet inks, and the like, but may be used in other applications such as coating materials.

MODE FOR CARRYING OUT THE INVENTION

The azo pigment of the present invention is an azo pigment containing two or more azo groups at symmetric positions in its molecule, wherein the value measured by a methanol wettability method mentioned later (MW value) is 10 or less and is more preferably 2 or more.

Examples of the azo pigment that can be used in the present invention include C.I. Pigment Yellow 155.

As in C.I. Pigment Yellow 155 (PY-155) (having azo groups at both sides of the phenylenediamine) of Patent Document 1 mentioned above, excellent azo pigments for image formation include those having two or more azo groups at symmetric positions in their molecules. These azo pigments are long thin in shape, as compared with phthalocyanine pigments or the like. Such a long thin molecule, when crystallized, tends to assume a needle form, which incurs an increase in the surface area. The particle surface of such a pigment varies depending on the crystal structure, etc. Therefore, when a large polar group, for example, is present in the molecule, its hydrophobicity is probably influenced by the crystal structure.

There occurs more frequent contact between the pigment particles having a long thin molecular structure with a rise in the pigment concentration of a dispersion. Furthermore, because of the large surface area, the viscosity of the dispersion tends to be increased by the interaction with the solvent or the interaction between the particles. As a result, the viscosity of the pigment dispersion increases, resulting in a significant reduction in the handling ability during a colorant preparation process step using said dispersion, and making large-scale production difficult and leading to a higher cost.

The increase in the viscosity of the pigment dispersion as described above can be solved by use of the azo pigment according to the present invention having a methanol wettability value (MW value) adjusted to 10% or less. An MW value exceeding 10% is not preferred because, as shown in Examples and Comparative Examples mentioned later, the viscosity of the pigment dispersion thus increased makes it difficult to uniformly disperse the pigment even with a dispersion operation performed for a long time, tends to cause large pigment particles to remain, and incurs a reduction in performance, such as reduction in image intensity in a scratch test.

It is preferred that the MW value of the azo pigment of the present application should be 2% or more. When the MW value is smaller, the image intensity in a scratch test tends to decrease, as seen in Examples mentioned later. When MW is less than 2%, the intensity is drastically decreased.

A preferred range of the MW is 3% to 7% in consideration of performance both in terms of reduction in the viscosity of dispersions and in terms of improvement in image intensity.

The method for measuring the methanol wettability (MW value) of the pigment according to the present invention involves, as described in a measurement method mentioned later, adding methanol into water on which pigment particles float, to enhance the affinity of the pigment toward the water so that the pigment particles settle down, and measuring the amount of this methanol added. Since a pigment having large hydrophobicity has small affinity toward water, this pigment is not sufficiently wetted with water so that its particles float on the water due to the surface tension of water. The addition of methanol thereto enhances the affinity of the pigment toward water by virtue of a reduction in the hydrophilicity of water and a reduction in the surface tension. When the amount of methanol added exceeds a specific value, the buoyancy based on the surface tension becomes less than gravity so that the pigment particles settle. This amount of methanol added (volume of added methanol per 100 ml of water) until the hydrophobic pigment particles settle is measured, and the obtained value is indicated in % unit. This value corresponds to the methanol wettability value.

A reduction in the viscosity of pigment dispersions, which is one of the objects of the present invention, is achieved by setting the MW value of a pigment prepared by a conventional process known to be suitable for uses in toner, to equal to or lower than a specific value, specifically, to 10% or less, through a finishing treatment.

The finishing in the preparation of an azo pigment is a final treatment step that is performed for the purpose of further improving the hue, light resistance, etc. of the pigment synthesized through a coupling reaction. This treatment is carried out by a method in accordance with the respective pigments and purposes.

In the case of C.I. Pigment Yellow 155, two methods have heretofore been practiced, i.e., a first method involving, after an azo coupling reaction, performing washing with water and drying and directly using the resulting pigment without a particular finishing, and a second method involving treating the pigment thus obtained with a solvent having a high boiling point and high polarity, for example, DMF.

Considering that the viscosity of pigment dispersions is largely influenced by the particle size or shape, the studies of the present invention have been conducted focusing on the finishing treatment as means for regulating the particle size or shape. Specifically, many types of solvents have been examined for finishing solvents, and conditions such as heating temperature and time have been searched for. As a result, it has been found preferable to use an alcohol solvent having a boiling point of 95° C. or higher instead of previously known ordinary solvents. Although the reason therefor is unknown, it is presumed that solvents may also be required to have a good balance between hydrophilicity and hydrophobicity for hydrophilizing the pigment surface.

The finishing solvent of the present invention is preferably an alcohol having a boiling point of 95° C. or higher. More specifically, among others, linear, branched or cyclic, saturated or unsaturated, monohydric or polyhydric alcohols having 3 to 8 carbon atoms, preferably 4 to 7 carbon atoms, for example, 1-propanol, 1-butanol, 2-butanol, isobutanol, 1-pentanol, 2-pentanol, 2-hexanol, 1-heptanol, 2-heptanol, ethylene glycol, and glycerin can be used each alone or as a mixture of two or more thereof. Among them, a branched saturated monohydric alcohol, in particular, isobutanol (boiling point=108° C.) is particularly preferred. Furthermore, any of these alcohols may be mixed with a further solvent, for example, a ketone solvent or an ether solvent.

The finishing treatment of the present invention is carried out, as shown in Examples mentioned later, by placing Pigment Yellow 155, which has been subjected to a pigmentation process, and a finishing solvent in a vessel, followed by heating. For this treatment, preferably 10 parts by weight to 100 parts by weight of a finishing solvent are added to 10 parts by weight of Pigment Yellow 155. Less than 10 parts by weight of a finishing solvent might fail to achieve a sufficient and uniform finishing treatment. More than 100 parts by weight of a finishing solvent are not preferred because the growth of particle crystals is too fast, making it difficult to control the particle size.

The heating temperature during the finishing treatment can be set to equal to or higher than the boiling point of the finishing solvent, thereby shortening the time of the finishing treatment. The heating temperature is usually within the range of temperatures 0 to 100° C. higher than the boiling point of the finishing solvent, more preferably temperatures 10 to 80° C. higher than the boiling point of the finishing solvent. When the temperature difference from the boiling point is small, the finishing requires a longer time. A temperature difference exceeding 100° C. from the boiling point is not preferred because side reactions such as the decomposition of the pigment tend to occur and in addition, a pressure-resistant container or the like is necessary.

The period of time for the finishing treatment of the present invention largely varies depending on the heating temperature and is usually 10 minutes or longer, preferably 20 minutes to 15 hours, particularly, 20 minutes to 5 hours. A shorter time tends to render the finishing non-uniform. Although there is no particular upper limit, a time exceeding 15 hours is not preferred because preparation cost is increased.

The preparation of azo pigments to obtain a methanol wettability within the range specified according to the present invention can be carried out by a conventional process described in, for example, the patent document mentioned above, followed by the finishing treatment as the final step. Alternatively, the methanol wettability may be adjusted, instead of the finishing treatment, for example, by treatments such as salting out at the stage of insolubilization or pigmentation after azo synthesis.

The pigment subjected to the finishing treatment described above is subjected to necessary treatments such as washing with water, drying, grinding, etc., and then subjected to any use in the subsequent step.

The C.I. Pigment Yellow 155 of the present invention varies in its primary pigment particle size, BET surface area, and aspect ratio depending on the finishing conditions. Though the degree of correlation is not so high, there is a general tendency that, as the MW value decreases to less than 12%, a larger primary particle size, a lower surface area, and a larger aspect ratio occur. The primary particle size is preferably 50 nm to 300 nm, particularly preferably 50 to 250 nm. The BET surface area is preferably 25 to 100 g/m$^2$. The aspect ratio is preferably within the range of 1 to 10, particularly preferably within the range of 2 to 7.

For adjusting the primary particle size to less than 50 nm, a dispersion operation for a long time is required and further, the resultant dispersion tends to be highly viscous or gelled, for example. When the BET surface area is less than 25 g/m$^2$, too large a particle size tends to incur a reduction in coloring power, etc. On the other hand, a BET surface area exceeding 100 g/m$^2$ is not preferred because the viscosity of the dispersion increases. Furthermore, as for the aspect ratio, a large aspect ratio exceeding 10, as in the needle-like crystals as mentioned above, tends to cause a rapid increase in the viscosity and a poor dispersion, resulting in a reduction in coloring power, a reduction in image quality, etc. The lower limit of the aspect ratio is theoretically 1, but a considerable reduction in performance is not observed even if the aspect ratio is decreased to 2 or less.

The performance of the C.I. Pigment Yellow 155 of the present invention may be influenced by the concentration of residual solvents in the pigment. Organic solvents may remain in the pigment, stemming from the solvent used in the synthesis of the pigment, the finishing solvent, and the like. As shown in Comparative Examples mentioned later, a high residual solvent concentration may reduce image intensity in a scratch test. A preferred range of the residual solvent concentration is 500 ppm at the maximum, particularly preferably 100 ppm at the maximum, particularly, 50 ppm at the maximum. A residual solvent concentration exceeding 500 ppm tends to entail side effects such as a reduction in the image intensity. Although there is no particular lower limit, the lower limit may be, for example, 0.5 ppm, on the ground that a long time is required for drying and is not preferred in terms of cost.

To the pigment of the present invention, two or more coloring materials may be added, where appropriate, according to intended applications. Such coloring materials are used for the purpose of, for example, changing the chroma, lightness, or hue angle of the yellow pigment of the present invention. The C.I. Pigment Yellow 155 mentioned above may be used in combination with a further pigment or a dye.

Various pigments are possible for combination with the Pigment Yellow 155 of the present invention. For use as, for example, yellow hue in combination with the pigment Yellow 155, examples of the further yellow pigment Y2 include C.I. Pigment Yellow 74, C.I. Pigment Yellow 120, C.I. Pigment Yellow 151, C.I. Pigment Yellow 180, C.I. Pigment Yellow 185, C.I. Pigment Yellow 194, C.I. Pigment Yellow 198, C.I. Pigment Yellow 213, C.I. Pigment Yellow 214, and C.I. Pigment Yellow 217.

Partner pigments used in combination with the Pigment Yellow 155 are not limited to yellow pigments. For representing green color by combination with a blue pigment, the Pigment Yellow 155 may be used in combination with at least one pigment selected from cyan pigments, for example, Phthalocyanine Blue pigments C.I. Pigment Blue 15:3, Pigment Blue 15:1, Pigment Blue 15:2, Pigment Blue 15:4, and Pigment Blue 15:6.

The compositional ratio between the Pigment Yellow 155 and a partner pigment combined with it largely varies depending on the hue of interest or intended applications. For example, the further pigment can be used within the range of 1 part by weight to 200 parts by weight relative to 100 parts by weight of the Pigment Yellow 155. When the ratio of the further pigment is less than 1 part by weight, adequate effects brought about by the combination cannot be expected. On the other hand, the further pigment at a ratio exceeding 200 parts by weight tends to cause large deviation from the hue of Pigment Yellow 155 or loss of its features such as high chroma.

A further coloring material used together with the pigment of the present invention is preferably a fluorescent dye. Fluorescent dyes, particularly, yellow fluorescent dyes, are highly capable of generating yellow to green fluorescence and can therefore significantly enhance the chroma of a colorant. Moreover, yellow fluorescent dyes are preferably used for improving the chroma of a yellow pigment and also for shifting its hue to bluish yellow. The details thereof are described in Japanese Patent Application No. 2014-157613 by the present inventors.

When a coating film is formed using only a fluorescent dye and a resin, it is preferred that the fluorescent dye provides a maximum wavelength of the coating film within the range of 490 to 550 nm and a maximum reflectance thereof of 90% or more, in a reflection spectrum measurement (mentioned later) as described in Japanese Patent Application No. 2014-157613. The maximum reflectance in the same wavelength region as above in the absence of a fluorescent dye is on the order of 20 to 80%. The difference between this reflectance and the reflectance of fluorescent dye-containing systems of 90% or more makes human sight perceive high chroma and bluishness.

For the yellow fluorescent dye, it is preferred that the reflection spectrum characteristics mentioned above should be 130% or less in the wavelength range mentioned above. A reflectance exceeding 130% is not preferred because the hue difference perceivable by human sight between the different color temperatures of light sources, etc. is large.

The yellow fluorescent dye used in the present invention is appropriately selected from perylene, fluorescein, benzothiazole, benzimidazole, benzoxazole, rubrene, stilbene compound, biphenyl, pyrazoline, coumarin, naphthalimide, oxazoline, and pyranine dyes, etc. Such dyes are mostly classified into fat-soluble dyes, disperse dyes, water-soluble dyes, etc. From them, the yellow fluorescent dye is appropriately selected and used.

In the present invention, for example, fat-soluble dyes such as C.I. Solvent Yellow 33, 98, 131, 135, or 160:1, disperse dyes such as C.I. Disperse Yellow 82, or water-soluble dyes such as C.I. Basic Yellow 40 are particularly preferably used as the yellow fluorescent dye.

In the present invention, the fluorescent dye may be used in an amount of 0.05 to 30 parts by weight relative to 100 parts by weight of the Pigment Yellow 155 pigment. A fluorescent dye used in an amount smaller than this range is less effective for improving the chroma. On the other hand, a fluorescent dye used in an amount larger than this range causes serious side effects such as a large hue difference between different light sources.

A more preferred composition of the fluorescent dye and the Pigment Yellow 155 pigment according to the present invention is 0.1 to 20 parts by weight relative to 100 parts by weight of the yellow pigment, more preferably 0.1 to 10 parts by weight relative to 100 parts by weight of the Pigment Yellow 155 pigment. These ranges are preferred from the viewpoint of decreasing the hue difference ΔE under light sources differing in their color temperature.

The pigment of the present invention is used, mainly, as a constituent in a colorant composition for image formation, etc. The process for preparing the colorant composition largely varies depending on intended applications. In the case of, for example, electrophotographic dry toner, the pigment is mixed with a solvent and a binder resin, and the mixture is dried and then ground. In the case of ink jet inks, the pigment is dispersed by adding thereto water or an organic solvent, a resin, and necessary additives.

Resins used in combination with the pigment of the present invention are not particularly limited. For image formation, in general, hydrophobic resins are preferably used for enhancing the mechanical strength, water resistance, etc. of images. Such resins can be appropriately selected from various resins such as polyesters, acrylics, polyolefins, styrenes, rubbers, polyamides, and urethanes.

Among them, particular preference is given to polyester, acrylic, styrene-acryl or urethane resins.

Resins used in combination with the pigment of the present invention are not limited to the thermoplastic resins described above. For example, curable resins three-dimensionally cross-linkable by light or heat, such as polyfunctional acrylic resins or epoxy resins, may be used according to intended applications.

The composition of pigments and resins in the colorant composition of the present invention largely differs depending on intended applications and is generally 0.5 to 30 parts by weight, preferably 1 to 15 parts by weight of the pigment relative to 100 parts by weight of the resin. At a ratio less than this range, it is required to increase the film thickness for obtaining the necessary degree of coloring. This may reduce drying or fixation performance or may reduce image quality. On the other hand, a ratio exceeding the range described above is not preferred because the mechanical strength, adhesion, etc. of pixels or the like formed with the coloring materials are reduced.

In addition to the azo pigment and the resin binder, the colorant composition of the present invention may be appropriately mixed with other materials in order to satisfy functions and physical properties necessary for respective intended applications. Examples of such additives include pigment dispersants, UV absorbers for improvement in light resistance, surfactants for improvement in coating properties, tackifiers for improvement in adhesion to substrates, etc., and waxes for controlling the heat characteristics or surface characteristics of colored coatings. In the case of toner for printers, it is preferred to add a charge control agent for controlling the electrostatic characteristics. Furthermore, the amounts of these additives added are within ranges appropriate for respective intended applications.

Various methods are possible for providing the azo pigment of the present invention according to intended applications or the situation where the azo pigment is used. For example, methods comprising:

1) causing an azo coupling reaction in a reaction vessel and removing impurities by washing with water, followed by drying and grinding to prepare an azo pigment, which is then subjected to the finishing treatment of the present invention, if necessary in a separate step;
2) after an azo coupling, performing washing with water and replacing the water with a low-boiling solvent or the like, followed by the finishing treatment of the present invention; and
3) after an azo coupling, performing washing with water and replacing the water with a low-boiling solvent or the like, followed by the addition of a further color pigment or a fluorescent dye and the subsequent finishing treatment;

are possible.

Method 1) is preferably carried out, for example, for conferring characteristics suitable for intended applications by adding the further pigment or the fluorescent dye to the azo pigment separately prepared, followed by finishing. Method 2) involves the finishing treatment performed subsequently to the preparation of the pigment and therefore reduces manufacture cost. Method 3) is preferred for adjusting the characteristics of the pigment by means of various colorants.

EXAMPLES

Example 1

As described in Example 1 of Japanese Patent No. 3917764 (Patent Document 2), diazotized dimethyl 2-aminoterephthalate was coupled with bis(acetoacetylamino)benzene, and the reaction mixture was then filtered and washed with water to obtain a pigment suspension. 100 parts by weight of the pigment suspension (pigment concentration: approximately 20%) were mixed with 500 ml of isobutanol (boiling point: 108° C.) in a vessel and subjected to a finishing treatment by heating at 150° C. for 1 hour, followed by distillation, washing with water, and drying to obtain a pigment of interest.

Example 2

A coupling reaction, filtration, and washing with water were performed in the same way as in Example 1, but followed by a finishing treatment under the conditions of 150° C. for 30 minutes to give a pigment C.I. Pigment Yellow 155.

Example 3

A coupling reaction, filtration, and washing with water were performed in the same way as in Example 1, but followed by a finishing treatment under the conditions of 150° C. for 2 hours to give a pigment C.I. Pigment Yellow 155.

Example 4

A coupling reaction, filtration, and washing with water were performed in the same way as in Example 1, but followed by a finishing treatment under the conditions of 150° C. for 4 hours to give a pigment C.I. Pigment Yellow 155.

Example 5

An azo coupling reaction, filtration, and washing with water were performed in the same way as in Example 1. Then, to 100 parts by weight of the pigment were added and mixed 100 parts by weight of a pigment press cake of C.I. Pigment Yellow 180 (manufactured by Clariant, Toner Yellow HG). The crude pigment was heated in isobutanol at 150° C. for 2 hours, followed by distillation, washing with water, and drying to obtain a yellow pigment containing a mixture of two pigments.

Example 6

An azo coupling reaction, filtration, and washing with water were performed in the same way as in Example 1. To 100 parts by weight of the not yet finishing-treated pigment press cake (Pigment Yellow 155) were added and mixed 10 parts by weight of a yellow fluorescent dye (C.I. Solvent Yellow 160:1, Lanxess, Macrolex Fluorescent Yellow 10GN), and the mixture was washed with water. The crude pigment was heated in isobutanol at 150° C. for 2 hours, followed by distillation, washing with water, and drying to obtain a yellow pigment containing a mixture of the C.I. Pigment Yellow 155 and the yellow fluorescent dye.

Comparative Example 1

A coupling reaction, filtration, washing with water, and drying were performed under the same conditions as in Example 1 except that no finishing treatment was performed, to prepare a pigment sample of Comparative Example 1. The morphology of the particles of this sample was very long thin needle-like crystals, as shown in the transmission electron microscope (TEM) photograph of FIG. 2 and the aspect ratio obviously exceeded 10. Its primary particle size and aspect ratio were difficult to measure, because the quantitative measurement of short diameters was difficult.

Comparative Example 2

A pigment sample of Comparative Example 2 was obtained under the same conditions in the same way as in Example 1 except that the finishing treatment was carried out by heating in dimethylformamide (boiling point: 153° C.) at 150° C. for 2 hours.

Measurement of Primary Particle Size and Aspect Ratio

The primary particles were measured by taking a transmission electron microscope (TEM) photograph of each pigment. For this purpose, the pigment was dispersed in diethyl ether for 15 minutes and subsequently applied onto a PET film by spraying. The microscope photograph was taken at magnifications of 13,000× and 29,000×. The particle size, major axis, and minor axis were counted as to 1000 particles, and the diameter of a circle equivalent to an area calculated from the major axis and the minor axis was used as the primary particle size.

Figure 1:
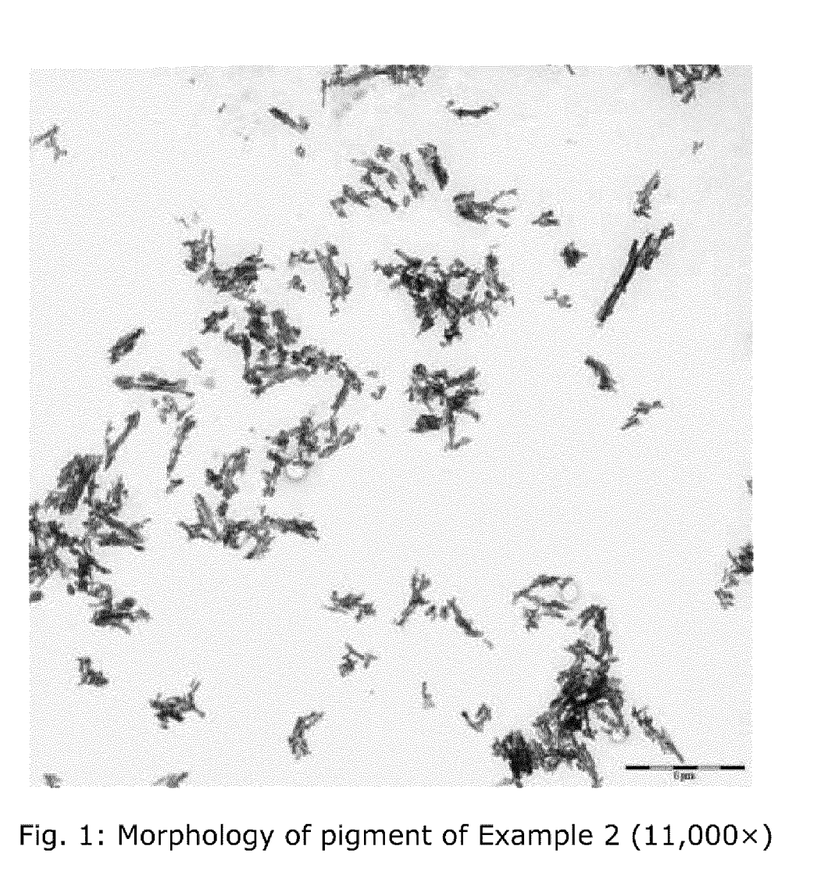
FIG. 1 is an electron microscope (TEM) photograph (×11,000) showing the morphology of the pigment of Example 2.
Figure 2:
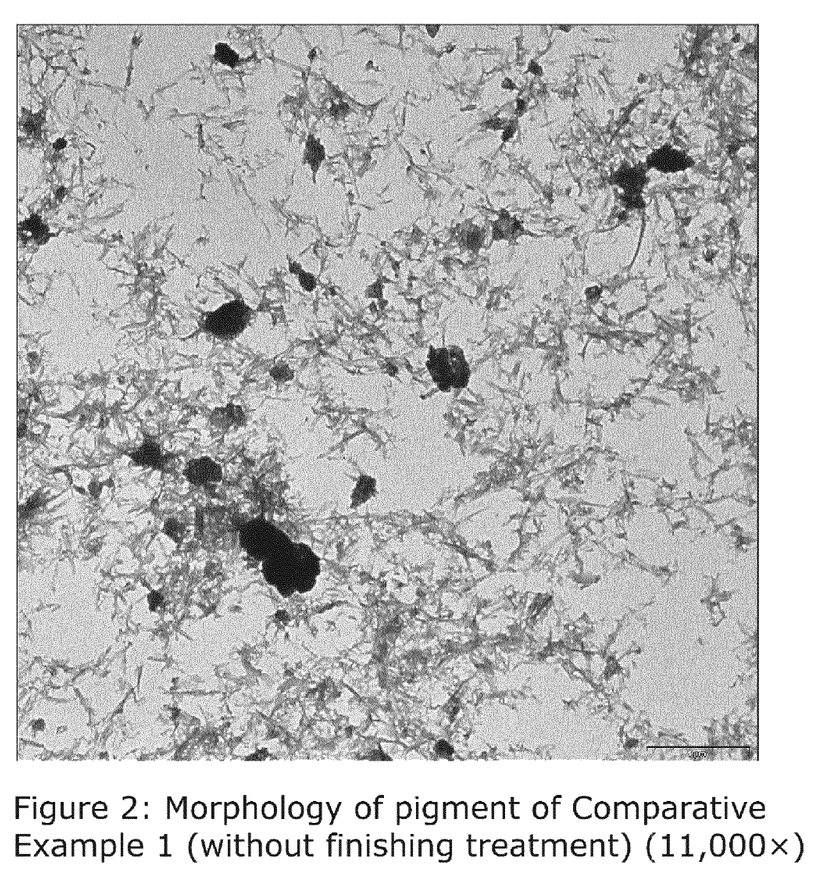
FIG. 2 is an electron microscope (TEM) photograph (×11,000) showing the morphology of the pigment of Comparative Example 1 (without finishing treatment). Very thin needle-like crystals coexisted with insufficiently dispersed pigment particles having a large particle size.

As for the aspect ratio, the ratio between the major axis and the minor axis was similarly averaged and indicated in the table. FIG. 1 is a morphological observation photograph of the Pigment Yellow 155 particles of Example 2 at the magnification of ×11,000. FIG. 2 is a morphological observation photograph of Comparative Example 1 (without finishing treatment) under the same conditions.

Measurement of Methanol Wettability MW Value 0.1 g of each pigment was placed in a beaker containing 100 mL of ion-exchanged water. The methanol wettability was measured using a commercially available measurement apparatus WET101P (manufactured by Rhesca Corp.). The rotational speed of a magnet stirrer was set to 200 rpm, and the rate of dropwise addition of methanol was set to 3 ml/min. Laser light was shone into the lower portion of the water tank, and the laser light intensity through the water tank was measured on the other side to measure transmittance. The pigment particles floated on the water surface before the addition of methanol. Thus, the transmittance of the laser light was 100%. As methanol was added, the pigment particles started to settle and the transmittance started to decrease. In the table, the methanol concentration at which the transmittance of the aqueous phase fell below 95% was measured, and this value was used as the MW value (e.g., if the pigment particles settle when 5 mL of methanol is added to 100 mL of water, the MW value is 5%).

Preparation of Sample for Dispersion Viscosity Measurement

In order to evaluate characteristics in a water-free solvent system, an alkyd-melamine (AM resin) varnish was selected. 3.6 g of each pigment, 26.4 g of a dispersion varnish, and 140 g of 3-mm glass beads were placed in a 150-mL plastic bottle and dispersed for 30 minutes using a paint shaker. Then, 60 g of a dilution varnish was placed in the bottle and mixed therewith for 5 minutes using a paint shaker to obtain a dispersion.

The dispersion varnish used had the following composition:
50.0 parts of Vialkyd AC451n/70SNB (AM resin and additive, manufactured by Esser-Lacke)
50.0 parts of Solvent Naphtha The dilution varnish had the following composition:
26.4 parts of Vialkyd AC451n/70SNB (AM resin and additive, manufactured by Esser-Lacke)
29.4 parts of Vialkyd AC451/60SNA (AM resin and additive, manufactured by Esser-Lacke)
35.8 parts of Maprenal MF600/55BIB (AM resin and additive, manufactured by Esser-Lacke)
2.17 parts of n-butanol
2.17 parts of Depanol I
1.86 parts of butyl diglycol
2.2 parts of Solvent Naphtha Dispersion Viscosity Measurement The viscosity was determined by examining the dependence of the viscosity of this dispersion on shear velocity within the range of 0 to 250 $s^{-1}$ using a cone/plate viscometer manufactured by Haake (Roto Visco 1) (titanium cone: 60 mm in diameter, 1°). The viscosity values reported in Table 1 were measured at a shear velocity of 250 $s^{-1}$.

Method for Measuring the Content of Organic Solvent 20 g of 3-mm glass beads was weighed into a 100-ml plastic bottle, and 3 g of each pigment sample was weighed into the bottle. 30 g of tetrahydrofuran was added thereto, and the mixture was lightly stirred and then dispersed for 1 hour using a paint shaker. The resulting dispersion was filtered under suction through a membrane filter having an aperture of 0.2 μm, and the filtrate was collected. The filtrate was analyzed by GC-MS to quantify the organic solvent in the pigment.

Method for Evaluating Coloring Power 0.6 g of each pigment, 10 g of a polyester resin (Finetone® 382ES, manufactured by Reichhold Chemicals, Inc.), and 20 g of a solvent (tetrahydrofuran) were weighed and placed in a 70-ml glass bottle. 70 g of glass beads having a diameter of 2 mm was weighed into the bottle and dispersed for 60 minutes using a vertical paint shaker. The resulting ink (pigment concentration: 6%) was developed onto coat paper using bar coater No. 2. A hot plate was used for drying after the development. The amount (wet) of a coating obtained using bar coater No. 2 was 12 μm. The color measurement of this developed matter was carried out at a viewing angle of 10° with D65 as a light source for measurement using a spectrophotometer [SPECTRA FLASH SF600 (manufactured by Data Color International)] to quantitatively evaluate the coloring power (%).

Evaluation of Image Intensity (Residual Rate After Scratch Test)

Each developed and dried sample prepared by the above method for evaluating coloring power was used. Friction was applied to the sample with 100 reciprocating motions of ordinary paper under a load of 200 g in a scratch testing machine (manufactured by Yasuda Seiki Seisakusho Ltd., type No. 162 SLIP TESTER) to wear the color coating film (printed matter). The yellow density of the printed matter was measured before and after the scratch test using SPECTROEYE (manufactured by Gretag-Macbeth Inc.) to calculate the residual density rate of the printed matter as shown in Table 1.

TABLE 1

Change in pigment characteristics under varying finishing conditions

| Example | Colorant | Finishing solvent | Finishing temperature (° C.) | Finishing time (hr) | Primary particle size (nm) | BET surface area (g/m²) | Aspect ratio | MW value (%) | Dispersion viscosity (mPas) | Organic solvent content (ppm) | Residual OD rate after scratch test (%) |
|---|---|---|---|---|---|---|---|---|---|---|---|
| Example 1 | PY155 | Isobutanol | 150 | 1 | 62 | 78 | 1.9 | 10 | 400 | 40 | 88.7 |
| Example 2 | PY155 | Isobutanol | 150 | 0.5 | 80 | 76 | 2.1 | 6 | 250 | 18 | 85.0 |
| Example 3 | PY155 | Isobutanol | 150 | 2 | 150 | 41 | 4.1 | 4 | 200 | 22 | 81.3 |
| Example 4 | PY155 | Isobutanol | 150 | 4 | 205 | 34 | 4.9 | 2 | 150 | 15 | 70.8 |
| Example 5 | PY155 + PY180 | Isobutanol | 150 | 2 | 100 | 65 | 2.5 | 4 | 150 | 30 | 84.5 |
| Example 6 | PY155 + fluorescent dye | Isobutanol | 150 | 2 | 100 | 64 | 2.5 | 5 | 180 | 23 | 82.7 |
| Comparative Example 1 | PY155 | — | — | 0 | Difficult to measure | 52 | Difficult to measure (presumed to be 20 or more) | 12 | 700 | 0 | 69.6 |
| Comparative Example 2 | PY155 | DMF | 150 | 2 | 130 | 46 | 2.0 | 1 | 200 | 500 | 52.6 |

The results of Table 1 are summarized as follows.
1) When the methanol wettability value (MW value) is 10% or less (Example 1), a viscosity of 400 mPas or less suitable for practical use is achieved. When the MW value exceeds 10% (Comparative Example 1), the viscosity is as very high as 700 (poor dispersion or problems associated with handling ability (productivity) occur).
2) As for the residual rate of the image density in the scratch test, the residual rate decreases with a decrease in the MW value. One of the causes thereof was presumed to be the increased hydrophilicity of the pigment surface (decreased MW value) resulting in a reduction in the affinity toward the resin and a reduction in the strength at scratch.
3) A higher residual rate of the image density after the scratch test is more preferred. Although the tolerable lower limit is uncertain, too low a value is not tolerated in consideration of the characteristics of other magenta or cyan pigments. The present inventors concluded that the lower limit of the residual rate is 70%. In view of this, the lower limit of the MW value for achieving image intensity seems to be 2% of Example 4.
4) Comparative Example 2 (MW value: 1), as compared with Example 4 (MW value: 2, residual rate: 70.8%), shows that the residual rate after the scratch test is significantly reduced (52.6%) by a decrease in the MW value only by 1. The reduction in the affinity of the pigment toward the resin resulting from the reduction in the hydrophobicity of the pigment surface is considered principally responsible for this.
5) Another possible factor is the residual solvent that causes concurrent resin plasticization or the like to significantly reduce the strength in the scratch test. Therefore, a lower residual solvent concentration in the pigment is more preferred. Thus, the residual solvent concentration is less than 500 ppm, preferably 300 ppm or less, more preferably 100 ppm or less, in particular, 50 ppm or less.
6) In spite of a MW value as high as 12% and the absence of remaining high-boiling solvents, Comparative Example 1 (without the finishing treatment of the present invention) exhibited a residual rate of 69.6% after the scratch test, which was lower than that of Example 1, etc. This is presumably because, as seen in the photograph of FIG. 2, large clumps of the particles are present and the resulting pigment is exposed to the printing surface. From this, it is understood that: when the MW value exceeds 10%, coarse particles are generated; and when the MW value is 2% or less, the pigment surface is hydrophilized reducing its adhesiveness to the resin, leading to a reduction in the residual rate after the scratch test.
7) As shown in Example 5, even the mixing system of different pigments (PY180) produces equivalent effects to the above and is also effective for, for example, improving the hue of a colorant.
8) As shown in Example 6, even the system supplemented with the fluorescent dye (SY160:1) produces equivalent effects to the above and is also effective for improving the chroma and lightness of a colorant.

The invention claimed is:
1. Pigment Yellow 155 having a methanol wettability (MW) value as a powder within a range of 2% to 10%, a primary particle size, as measured by TEM, of 62 nm to 300 nm, and an aspect ratio of 1 to 10.
2. Pigment Yellow 155 as claimed in claim 1, having a residual organic solvent content of less than 500 ppm.
3. Pigment Yellow 155 as claimed in claim 2, having a residual organic solvent content of less than 100 ppm.
4. Pigment Yellow 155 as claimed in claim 2, wherein the organic solvent is an alcohol having a boiling point of 95° C. or higher.
5. Pigment Yellow 155 as claimed in claim 4, wherein the alcohol is a linear, branched or cyclic, saturated or unsaturated, monohydric or polyhydric alcohol having 3 or more carbon atoms.
6. Pigment Yellow 155 as claimed in claim 5, wherein the alcohol is one or more selected from the group consisting of 1-propanol, 1-butanol, 2-butanol, isobutanol, 1-pentanol, 2-pentanol, 2-hexanol, 1-heptanol, 2-heptanol, ethylene glycol, and glycerin.
7. Pigment Yellow 155 as claimed in claim 4, wherein the alcohol is a finishing solvent used during preparation of the Pigment Yellow 155.
8. An azo pigment composition comprising Pigment Yellow 155 as claimed in claim 1, and a further color pigment and/or a yellow fluorescent dye.

9. A pigment composition as claimed in claim 8, wherein the further color pigment is one or more selected from the group consisting of C.I. Pigment Yellow 74, C.I. Pigment Yellow 120, C.I. Pigment Yellow 151, C.I. Pigment Yellow 180, C.I. Pigment Yellow 185, C.I. Pigment Yellow 194, C.I. Pigment Yellow 198, C.I. Pigment Yellow 213, C.I. Pigment Yellow 214, and C.I. Pigment Yellow 217, and the yellow fluorescent dye is one or more selected from the group consisting of Solvent Yellow 33, Solvent Yellow 98, Solvent Yellow 131, Solvent Yellow 135, and Solvent Yellow 160:1.

10. A colorant composition comprising Pigment Yellow 155 as claimed in claim 1, a polymer, and a wax.

11. A colorant composition comprising a pigment composition as claimed in claim 8, a polymer, and a wax.

12. A colorant or an image formation composition comprising Pigment Yellow 155 as claimed in claim 1.

13. A colorant or an image formation composition comprising Pigment Yellow 155 as claimed in claim 1 and a further color pigment and/or a yellow fluorescent dye.

* * * * *